US010065523B2

(12) United States Patent
Wood et al.

(10) Patent No.: US 10,065,523 B2
(45) Date of Patent: Sep. 4, 2018

(54) ENGINE START AND BATTERY SUPPORT MODULE

(71) Applicant: Ioxus, Inc., Oneonta, NY (US)

(72) Inventors: Robert J. Wood, Naples, FL (US); Chad Hall, Walton, NY (US); Daniel A. Patsos, Otego, NY (US); Jeff Colton, San Diego, CA (US); Bryce Gregory, Port Crane, NY (US)

(73) Assignee: IOXUS, INC., Oneonta, NY (US)

( * ) Notice: Subject to any disclaimer, the term of this patent is extended or adjusted under 35 U.S.C. 154(b) by 321 days.

(21) Appl. No.: 15/045,486

(22) Filed: Feb. 17, 2016

(65) Prior Publication Data

US 2016/0243960 A1     Aug. 25, 2016

Related U.S. Application Data

(63) Continuation of application No. PCT/US2015/033743, filed on Jun. 2, 2015.
(Continued)

(51) Int. Cl.
*H02J 7/00*     (2006.01)
*B60L 11/18*    (2006.01)
(Continued)

(52) U.S. Cl.
CPC ......... *B60L 11/1861* (2013.01); *B60L 11/005* (2013.01); *H02J 7/007* (2013.01);
(Continued)

(58) Field of Classification Search
CPC ...................................................... Y02T 90/14
(Continued)

(56) References Cited

U.S. PATENT DOCUMENTS 5,710,699 A     1/1998  King et al.
6,476,586 B2 *  11/2002 Yunosawa ............... E05B 77/12
                                                         307/108
(Continued)

FOREIGN PATENT DOCUMENTS

DE   10 2004 044469 A1   3/2006
FR         2913825 A1    9/2008

OTHER PUBLICATIONS

Extended European Search Report for European Application No. 15809719.6, dated Feb. 5, 2018, 8 pages.
(Continued)

*Primary Examiner* — Yalkew Fantu
(74) *Attorney, Agent, or Firm* — Cooley LLP

(57) ABSTRACT

An Engine Start and Battery Support Module for a vehicle is provided that utilizes a bank of Ultra Capacitors (UCs) charged with or without running the vehicle's alternator to levels that support both engine starting assistance and hotel load support. The UCs' per-cell charge can be adjured and raided during periods of low temperatures and even higher during ultralow temperatures. The adjustment, which can be dynamic and/or automatic, increases the UC energy storage capability. Further, the release of energy from the UCs is controlled by a pulse width modulation (PWM) controller based on the DC bus voltage. The UCs can be charged either from an onboard DC/DC converter, an AC hook up, or from smartly switching the banks of UCs between parallel and serial configurations.

15 Claims, 14 Drawing Sheets

Related U.S. Application Data

(60) Provisional application No. 62/014,910, filed on Jun. 20, 2014.

(51) Int. Cl.
  *H02J 7/34* (2006.01)
  *B60L 11/00* (2006.01)
  *H02J 7/14* (2006.01)
  *F02N 11/08* (2006.01)

(52) U.S. Cl.
  CPC ............ *H02J 7/1423* (2013.01); *H02J 7/345* (2013.01); *F02N 11/0866* (2013.01); *F02N 2011/0885* (2013.01); *F02N 2011/0888* (2013.01); *F02N 2200/063* (2013.01); *F02N 2200/064* (2013.01)

(58) Field of Classification Search
  USPC ......................................................... 320/109
  See application file for complete search history.

(56) References Cited

U.S. PATENT DOCUMENTS

| | | | |
|---|---|---|---|
| 6,518,733 B1 * | 2/2003 | Schenkel | H02M 3/33507 320/166 |
| 6,799,070 B2 | 9/2004 | Wolfe et al. | |
| 7,633,271 B2 * | 12/2009 | Schulte | B60L 7/06 307/109 |
| 8,655,574 B2 * | 2/2014 | Izumoto | F02N 11/0866 701/112 |
| 8,886,425 B2 * | 11/2014 | Doering | B60K 6/48 701/55 |
| 2003/0151875 A1 | 8/2003 | Nguyen et al. | |
| 2009/0314561 A1 * | 12/2009 | Handa | F02N 11/0866 180/65.25 |
| 2010/0148582 A1 | 6/2010 | Carter | |
| 2012/0237799 A1 * | 9/2012 | Jiang | H01M 2/1072 429/7 |
| 2013/0031318 A1 | 1/2013 | Chen et al. | |
| 2014/0041179 A1 | 2/2014 | Bradley et al. | |
| 2015/0240939 A1 * | 8/2015 | Ge | F16H 61/0213 701/50 |

OTHER PUBLICATIONS

International Search Report and Written Opinion for International Application No. PCT/US2015/033743, dated Aug. 25, 2015, 11 pages.

* cited by examiner

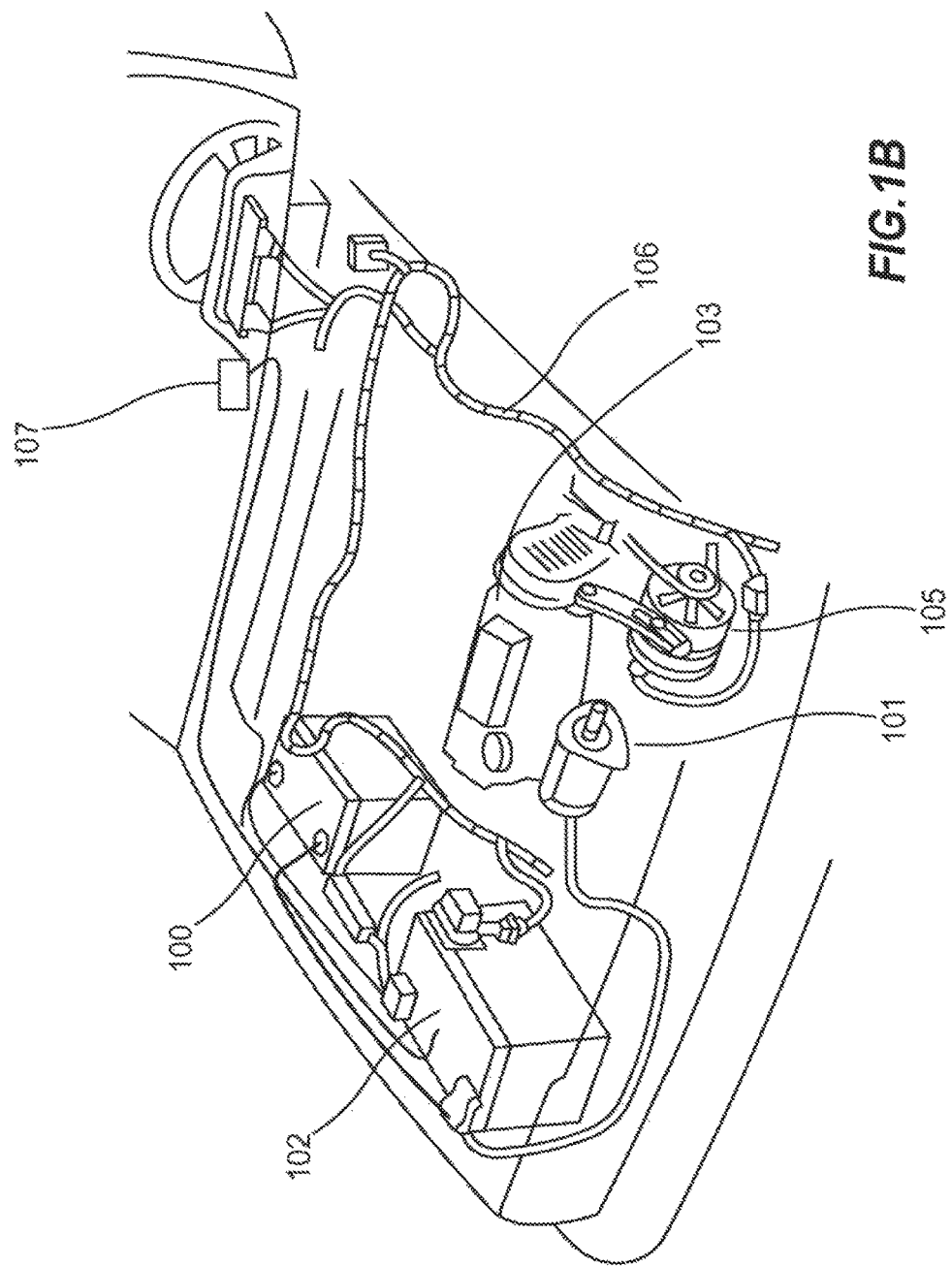

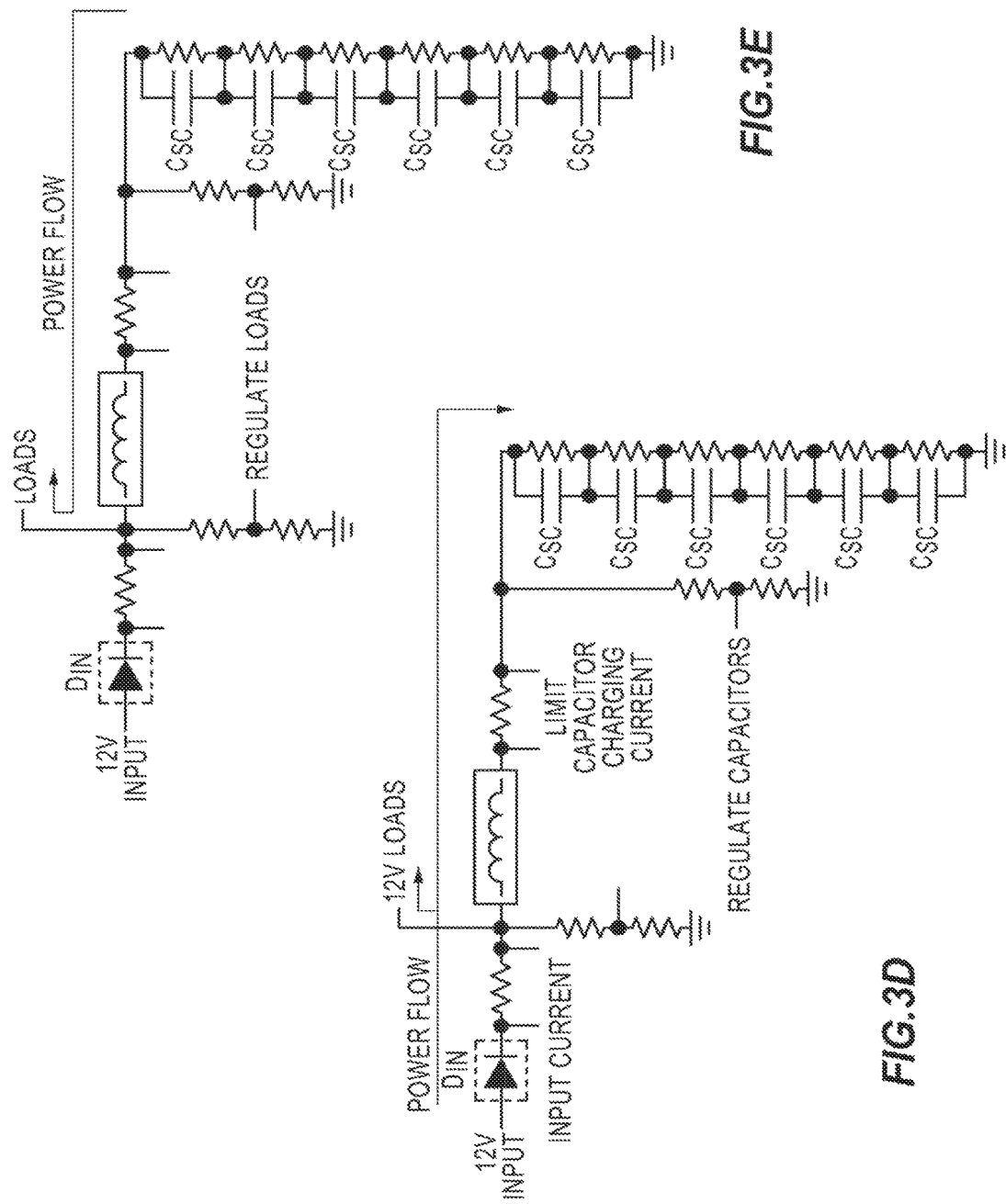

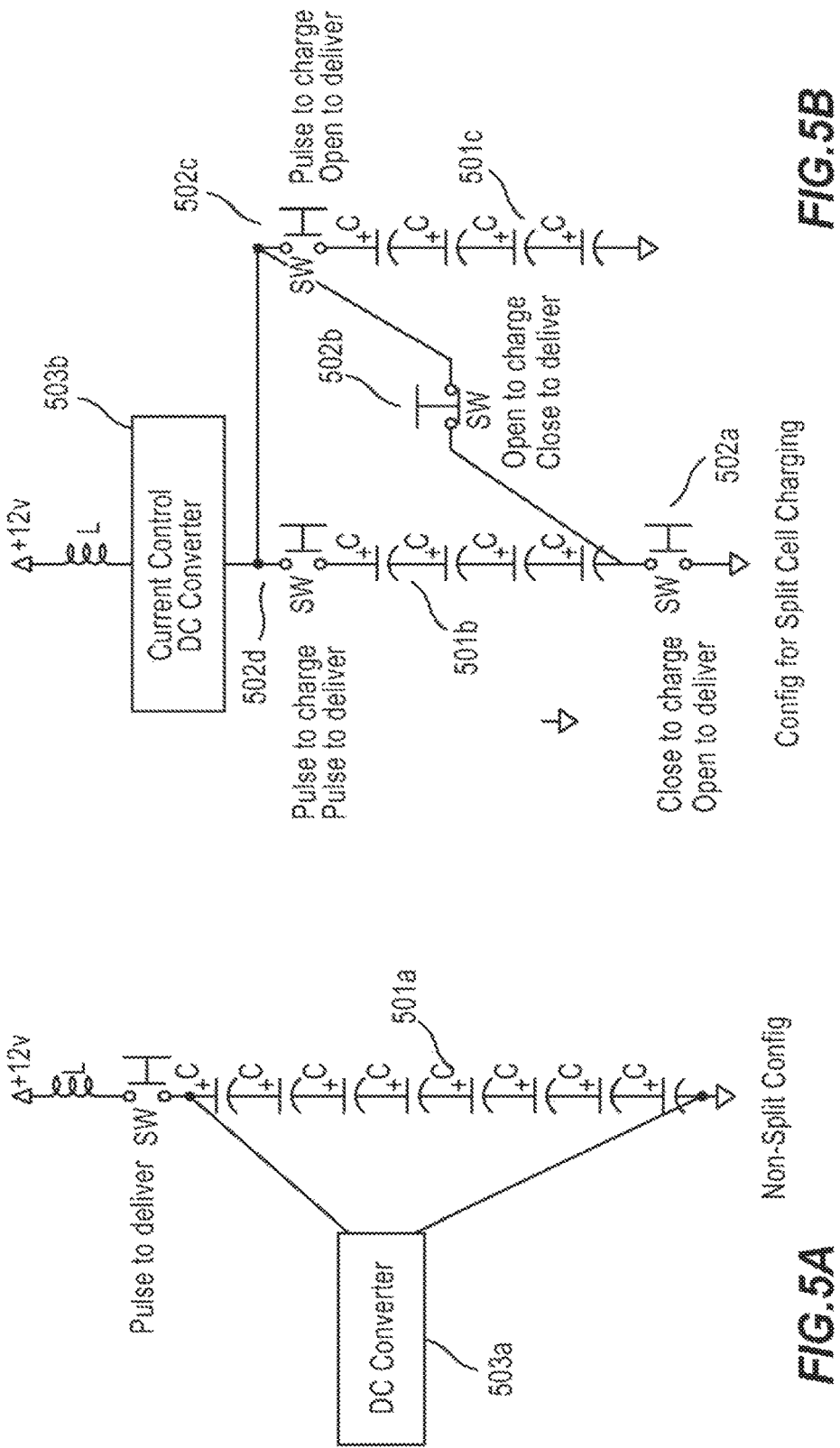

ENGINE START AND BATTERY SUPPORT MODULE

CROSS-REFERENCE TO RELATED APPLICATION(S)

This application is a continuation of and claims the priority benefit, under 35 U.S.C. 111(a), of International Application Ser. No. PCT/US15/33743, filed Jun. 2, 2015, entitled "Engine Start and Battery Support Module," which claims the priority benefit, under 35 U.S.C. 119(e), of U.S. Application No. 62/014,910, entitled "Energy Start and Battery Support Module" and filed on Jun. 20, 2014. The aforementioned applications are incorporated herein by reference in their entirety.

BACKGROUND

Changes to common practice, laws, and accepted behavior in both the automotive and trucking industries has forced the shutdown of engines during stops. Shutting down a car or truck engine causes stress on the battery and starter motor, leading to weakened batteries and overall lower system performance. Harsh conditions such as extreme cold environments exacerbate the problem and may lead to outright battery failure and/or starter failure.

The number of shutdowns per day for an engine may depend on the vehicle architecture, vehicle use, etc. In general, there are two types of vehicle architectures: "local delivery" vehicles, which can have, for example, as many as 250 shut-off events per day, and "long haul" vehicles, which can have up to for example, 25 shut-off events per day. These shut-off events create low voltage conditions on the vehicle's DC electrical bus, which result in higher power requirements from the on-board energy storage system. Low voltage conditions on the DC electrical bus can also stress other vehicle components, including Electronic Control Units (ECUs), relays, switches, and pumps.

SUMMARY

Embodiments of the present invention include an energy start and battery support module configured to support the supply of energy directly to the vehicle's direct current (DC) voltage bus using Ultra Capacitors (UCs) that allow both the spinning of the starter motor and voltage support for short term battery loads during stops when the vehicle's engine is off. This module does not necessarily require any wiring changes to the vehicle, nor does it necessarily require or involve any vehicle alterations or changes to vehicle operating procedures.

The module can automatically stabilize the vehicle's DC voltage during off sequences regardless of the static load variations or engine starter variations by modulating the transfer of energy—including during engine start—in order to support a healthy battery and longer starter life. It can automatically adjust the amount of energy it stores in order to prolong the lives of the UCs and the electronics within the module. In some cases, the module supplies the proper voltage for the vehicle's electronics and/or the vehicle's starter in the event that the vehicle's battery is totally dead.

Some embodiments of the module can recharge the UCs automatically based on the ability of the vehicle to supply power. For example, the module may include a DC boost converter that recharges the UCs or a switch that splits the UCs into two or more equal or unequal stacks and buck charges the stacks in parallel. The module may transfer more power to the UCs if the alternator is running and less power if the vehicle's batteries do not have enough energy to initiate a vehicle starting sequence. The module can also transfer energy from the UCs when the vehicle's alternator is not running. In some cases, the module may not drain the vehicle's battery below a preset voltage level, e.g., 9 volts in a 12-volt system or 18 volts in a 24-volt system.

In some embodiments, the module allows a vehicle's operator to re-initiate the charging of the module in the event the vehicle does not start on the first try or the batteries are too weak to supply enough power on their own, eliminating the use of a separate jump start. In some embodiments, the module can fit into a standard battery area on the vehicle using a standard battery case size or can be scaled for any vehicle as desired.

In some embodiments, the system can pass the 30-day airport test in any vehicle without causing the batteries to go dead. As understood by those of skill in the art, the 30-day airport test simulates leaving a vehicle parked at an airport, at temperatures down to −20° C., for 30 days. During these 30 days, the vehicle's electrical system consumes energy from the battery or energy storage system lo run critical vehicle systems, such as alarms, computers, locking mechanisms, clocks, etc. When the vehicle owner returns, the vehicle should have enough energy remaining in its energy storage system (traditionally a lead acid battery) to initiate the cranking event and support the engine starting systems. Passing the 30-day airport test is a common requirement for automotive battery and electrical systems.

The module can be implemented as a solid-state system (e.g., without relays to transfer of energy in either direction). For example, the module's electronics may include one or more enhancement mode n-channel field-effect transistors (N-FETS), which can be used in parallel to reduce the Equivalent Series Resistance (ESR) of the delivery of the energy or even in the split mode recharging scheme. In some embodiments, the total quiescent current of the electronics may be less than 50 mA so that excess drain does not occur over extended periods of time.

A module may include a DC converter whose input and output voltage and current can be controlled, allowing: (1) the voltage on the back of UCs to be controlled precisely; (2) the charge current on the UCs to be controlled, facilitating the ability to bring a completely dead set of UCs up to full charge; (3) the input current to be set so as not to draw too much power out of the system, allowing the vehicle's DC bus to operate other devices; and/or (4) the minimum input voltage to be set for throttling back the UCs charging in order to avoid operating the battery systems outside of a desired or predetermined (e.g., safe) operating regime.

The DC converter can be broken up into multiple phase angles, enabling lower peak currents, less electromagnetic interference (EMI), and/or smaller more efficient components. The multiple phases, may be equally spaced on a 360° basis. For example, a 4-phase DC converter splits, the current pump charge into four equal parts that are 90 degrees apart in the time spectrum. The DC converter can control the current and/or voltage un the input side and the current and/or village on the output side. For instance, the voltage output can set the maximum voltage potential that is stored on the UCs, which may equal the stored energy (the energy may be expressed by the equation $E=0.5CV2$). Current output control may allow the DC converter to charge a completely empty bank of UCs without excessive current (e.g., current that would normally collapse the converter). In some embodiments, the input voltage limit and the input current control may allow the system to operate when the alternator is not running and energy being transferred off the battery is limited to prevent the DC bus from going below a predetermined voltage (e.g., 9 V for a 12 V system or 18 V for a 24 V system).

The module can be packaged to have only two terminal connections to the outside world and can be connected to an engine just like a battery is connected to the engine. Installation may be simple and safe, and little to no current may flow when the module is initially connected. The controls can be co-located on a single printed circuit board assembly (PCBA) for simplicity and lower cost.

Control of the entire system can be based on the DC voltage, which enables the bidirectional transfer of energy using acceptable set points and predetermined battery voltages. This control can be accomplished in either the analog or digital domain; control can also be asynchronous and therefore adaptable to just about any vehicle. The control has appreciably zero built-in hysteresis, thus allowing fast and extremely steady voltage levels. Stability may be achieved because it is asynchronous and has no forced frequency domain in the response. In other words, the transfer of energy may not be forced at any rate or regulator repeated pulses. In some cases, only enough energy is transferred to satisfy the set points. Since each vehicle and each vehicle's wiring loads are unique, this allows a one-size-fits-all module architecture.

An example module can include active balancing circuits for controlling (e.g., equalizing) the Ultra Capacitor charge, thereby preventing any single Ultra Capacitor from taking too much energy. The UC balancing circuit can be dynamic and the set points may vary with temperature. Because the energy is modulated back to the vehicle's DC bus, the energy stored in the UCs can be higher than that of the vehicle's rated system itself. This allows more energy to be stored and fewer peak currents to occur than is the case when energy is stored at a nearly equipotential. This method supports extended static vehicle load support for longer periods, including those in the delivery vehicle use case. There is no practical limit to the number of Ultra Capacitors used to store energy or their exact parallel/series configurations as long as the total cell voltage is higher than the voltage level of the vehicle's battery system.

In some embodiments, the module can include multiple voltage comparators (e.g., three for each DC converter) and logic coupled to the voltage comparators. The logic determines whether or not to recharge or deliver energy based on the values of some or all of the voltage comparators (e.g., two of the three voltage comparators). This substantially increases the system's overall reliability and dependability. It can also include two smaller DC converters that support the operation of the system's electronics over a very wide DC bus operating range and overcome the gate-source voltage threshold.

The module can be compatible with batteries of any chemistry, including but not limited to lead acid batteries.

Additional embodiments of the present technology include methods for regulating a voltage level of a vehicle battery in a vehicle. In an example method, control logic determines if the voltage level is below a predetermined voltage threshold, which may be based on the vehicle battery age, vehicle age, vehicle battery condition, vehicle battery quantity, vehicle battery type, vehicle starter type, starter age, temperature, and experience of the vehicle driver. If the voltage level is below the predetermined voltage threshold, the control logic initiates a discharge of at least one ultracapacitor in electrical communication with the vehicle battery. The control logic modulates the discharge of the ultracapacitor so as to raise the voltage level at least to the predetermined voltage threshold, e.g., by controlling current flow through at least one transistor in electrical communication with the ultracapacitor.

In addition, the control logic may transfer energy from the vehicle battery to the ultracapacitor while the vehicle alternator is off. This transfer of energy can be initiated after determining that the voltage level exceeds a recharge voltage threshold. In some cases, the transfer of energy is initiated only when voltage amount of the vehicle battery exceeds the recharge voltage threshold. Energy may also be transferred from the vehicle battery to the ultracapacitor when the voltage level is less than a voltage level required to start the vehicle.

In some cases, there may a plurality of ultracapacitors that are switched by the control logic between a parallel configuration for charging and a serial configuration for discharging.

Another example of the present technology includes an apparatus for regulating a voltage level of a vehicle battery. This apparatus may comprise a plurality of ultracapacitors connected in series to store charge; at least one voltage comparator in electrical communication with the vehicle battery and the ultracapacitors; and control logic in electrical communication with the voltage comparator and the ultracapacitors. In operation, the comparator performs a comparison of the voltage level to a predetermined voltage threshold. And the control logic modulate discharges of the ultracapacitors based on the comparison so as to raise the voltage level to at least the predetermined voltage threshold.

In some embodiments, the control logic comprises at least one transistor, in electrical communication with the ultracapacitors, to control current flow into and/or out of the ultracapacitors. The comparator can be in electrical communication with a gate of the transistor to control the current flow into and/or out of the ultracapacitors.

The apparatus may also comprising a direct current (DC) converter in electrical communication with the ultracapacitors and the voltage comparator(s). In operation, the DC converter charges the ultracapacitors in response to a comparison of the voltage level and a recharge voltage threshold. In these examples, the voltage comparator may comprises a first voltage comparator in electrical communication with the DC converter and a second voltage comparator in electrical communication with the control logic. The first voltage comparator enables the DC converter if the voltage level exceeds the recharge voltage threshold, and the second voltage comparator performs the comparison of the voltage level to the predetermined voltage threshold. The DC converter can also be configured to transfer charge from the vehicle battery to the ultracapacitors in response to an output from the voltage comparator indicating that voltage level is above the recharge voltage threshold. And the DC converter can deliver energy to a vehicle bus of the vehicle in response to an output from the comparator(s).

The apparatus may also include a temperature sensor, operably coupled to the DC converter, to monitor a temperature of the vehicle battery. If desired, the DC converter can be configured to vary the predetermined voltage threshold and/or the recharge voltage threshold based on the temperature of the vehicle battery.

The apparatus may also include a switch, in electrical communication with the ultracapacitors, to switch the ultracapacitors between a serial configuration and a parallel configuration, e.g., for discharging and charging, respectively. And the apparatus may include a manual interface, operably coupled to the control logic, that enables a driver of the vehicle to engage and/or disengage the apparatus.

Another embodiment includes an apparatus for regulating a voltage level of a vehicle battery that includes: a plurality of ultracapacitors; a first voltage comparator in electrical communication with the vehicle battery: control logic in electrical communication with the first voltage comparator and the ultracapacitors; a second voltage comparator in electrical communication with the vehicle battery; control logic in electrical communication with the first voltage comparator and the ultracapacitors; a DC converter in electrical communication with the ultracapacitors and the second voltage comparator; and a temperature sensor operably coupled to the DC converter. In operation, the first voltage comparator compares the voltage level to a first voltage threshold. The control logic discharges the ultracapacitors if the voltage level is below the first voltage threshold. The second voltage comparator compares the voltage level to a second voltage threshold. The control logic discharges the ultracapacitors if the voltage level is above the second voltage threshold. The DC converter charges the plurality of ultracapacitors if the voltage level is above the second voltage threshold. And the temperature sensor monitors a temperature of the vehicle battery. The DC converter can also vary the first voltage threshold and/or the second voltage threshold based on the temperature of the vehicle battery.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings like reference characters generally refer to like features (e.g., functionally similar and/or structurally similar elements).

FIGS. 1B-C are schematic diagrams illustrating example use of Engine Start and Battery Support Module installed in a vehicle (e.g., a car or truck).

FIGS. 3D-E show example features of the isolated DC converters of FIG. 3C.

PIGS. 5A-B shows ultracapacitors arranged in a non-split (FIG. 5A) and split (FIG. 5B) series configuration for use in an Energy Start and Battery Support Module.

Figure 6A:
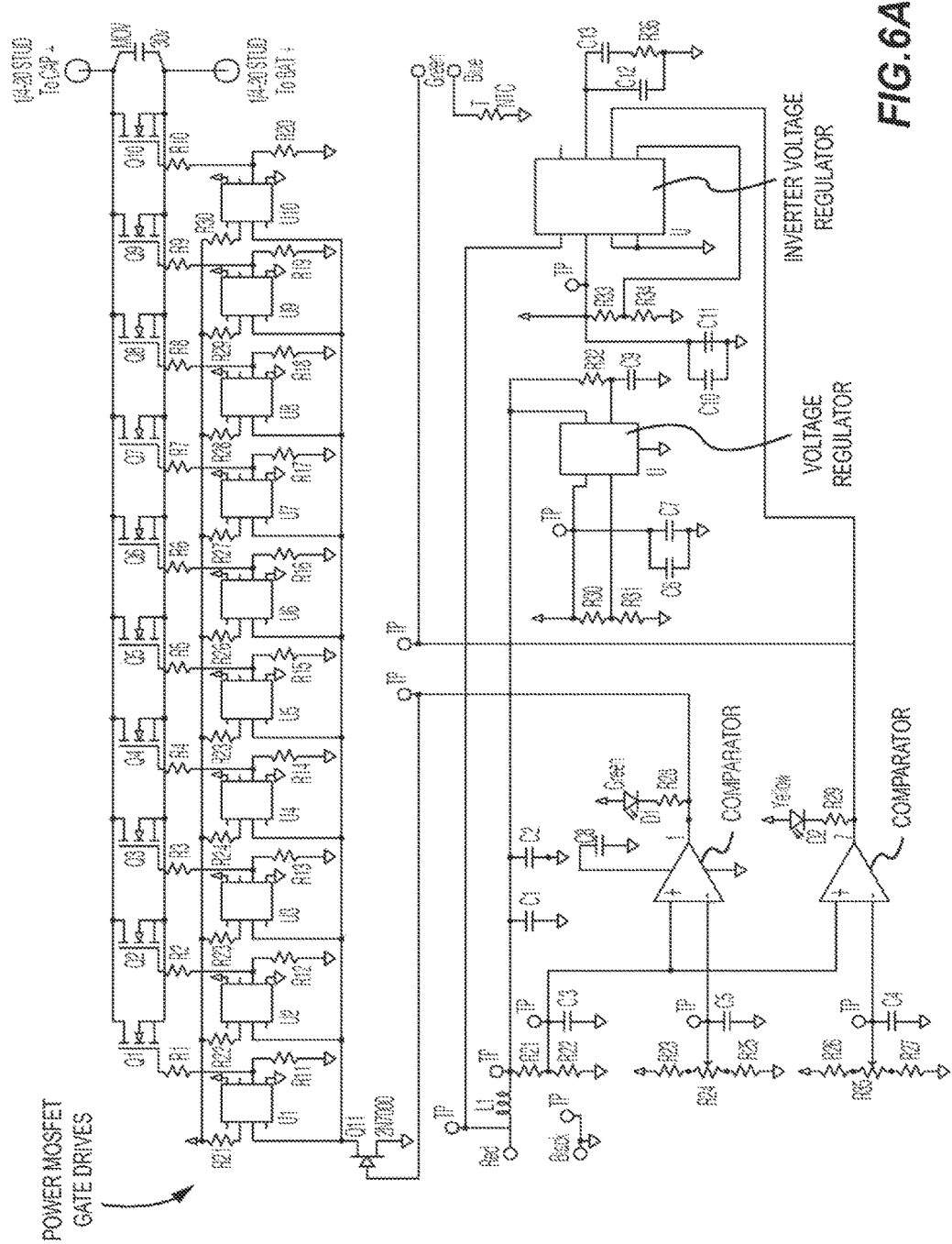
Figure 6B:
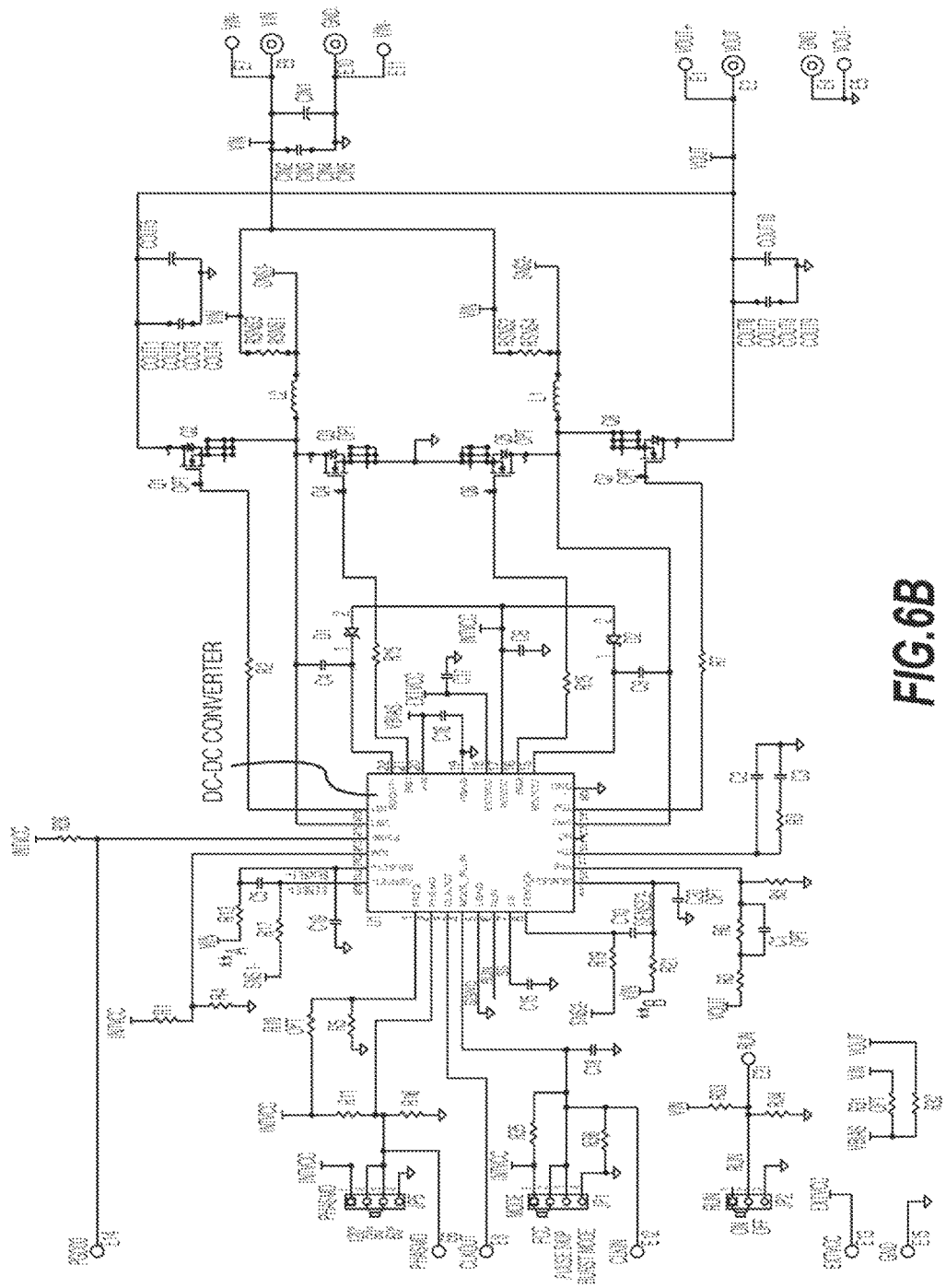

FIGS. 6A-B show circuit diagrams of example direct current converters that can be used in the Engine Start and Battery Support Module.

Figure 7:
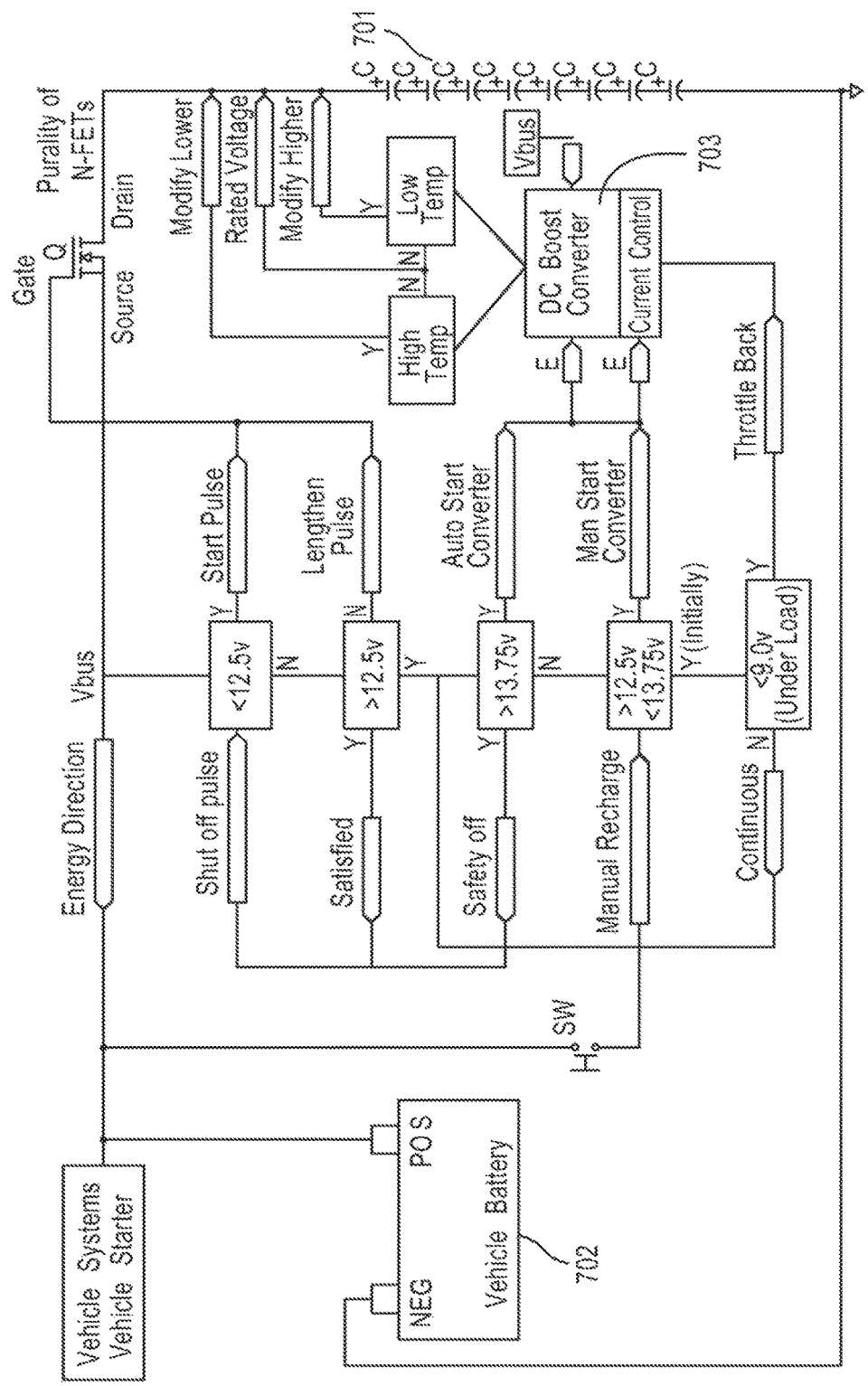

FIG. 7 shows a flow diagram illustrating an example operation of an Engine Starr and Battery Support Module.

DETAILED DESCRIPTION

Ultracapacitor-based engine cranking systems can be used to assist vehicle battery systems to crank when initiating an engine starting sequence. With these systems, existing vehicle wiring systems may be rerouted to create a direct connection from the ultracapacitors to the starter motor. In some cases, the ultracapacitors may be in parallel with the vehicle batteries. As the starting sequence is initiated, the ultracapacitors are discharged, providing energy to spin the starter motor. After the engine is started, the vehicle's alternator generator is used to generate electricity and thus recharge the ultracapacitors. This system may also include a DC/DC converter that recharges the ultracapacitors from the parallel connected batteries.

An Example Engine Start and Battery Support Module

Figure 1A:
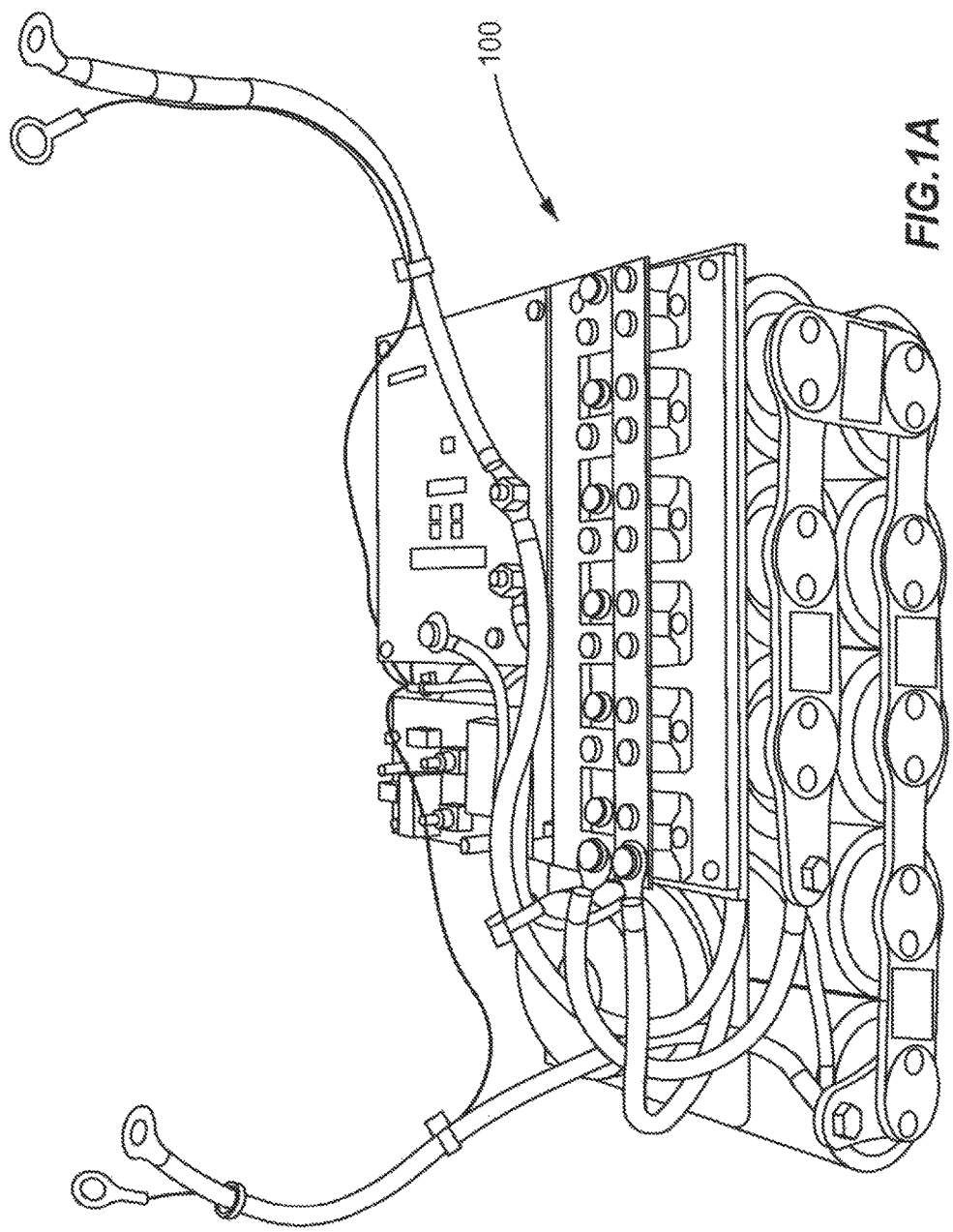
FIG. 1A is a photograph of an example Engine Start and Battery Support Module.
Figure 1C:
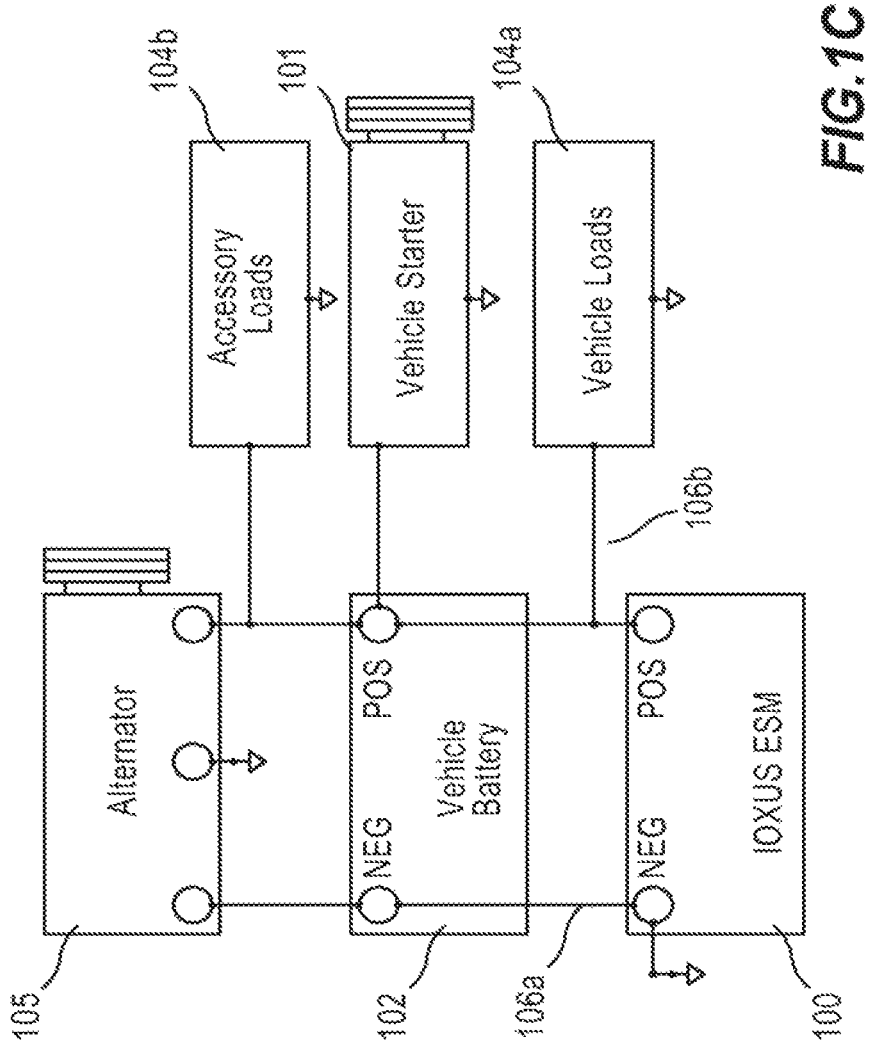

FIG. 1 shows an example ultracapacitor (UC)-based Engine Start and Battery Support Module (hereinafter a "Module") 100 that can be used to assist a vehicle battery system during an engine starting sequence. The Module 100 shown in FIG. 1 is a two-wire system and can be included into any standard DC bus in parallel with any number of batteries. The Module 100 can be used to maintain a healthy DC bus voltage for a vehicle that is starting (e.g., by vehicle starter 101) or consuming a large load while stopped. It may be used to augment existing batteries 102 in vehicles, e.g., as shown in FIGS. 1B-C, or as a replacement for traditional lead acid batteries. Some of the advantages of such a module are that it can be installed safely and without special tools and may require little or no wiring changes to existing infrastructures.

In some embodiments, the Module 100 can include a bank of UCs that supports both engine 103 starting assistance and "hotel load" 104a support. The term "hotel load" refers to the non-driving energy demands on a vehicle, including energy use for lights, air conditioning, heating, computers, tracking systems, safety systems, etc., which are indicated in FIG. 1C as vehicle loads 104a and accessory loads 104b. When a vehicle's engine 103 is off, the vehicle's energy demands constitute the hotel load. The Module 100 can be used to start a vehicle and/or to deliver energy back to the vehicle in a controlled fashion to support either the vehicle's static loads during short term stops and/or to supply energy to get the vehicle's electronics functioning, thus allowing the vehicle to start once the engine 103 is cranked. Examples of static loads during short stops may be the electronics, air-conditioning, lighting systems, etc., left on once the vehicle's engine 103 has stopped. In some embodiments, the static loads may include accessory loads 104b.

In some embodiments, the Module 100 can be configured to address the difficulty/inability of vehicles to start in adverse weather, under duress from extremely weak batteries, and/or from the effects of an excessively high number of engine starts. Further, the Module 100 enhances the health of the vehicle's battery 102 and starter motor 101 by maintaining (e.g., increasing if it has fallen) the voltage on the vehicle's direct current (DC) bus 106, which comprises, for example, negative DC bus 106a and positive DC bus 106b (FIG. 1C), during short off times and cranking. For example, maintaining a higher and/or more stable voltage allows for increases in the life of the batteries 102 and the starter motor 101, in some cases dramatically.

In some embodiments, the Module 100 may be all solid-state. As understood in the art of electronic, solid-state components, including field-effect transistors (FETs) and insulated gate bipolar transistors (IGBT), tend to be faster, more reliable, and consume less power than relays and contactors. Further, the Module 100 may provide capabilities to allow a driver a manual "Redo" button that would start the transfer of energy from the batteries 102 to the DCs. For example, this may be used in the situation where the vehicle may not start the first time. Such may allow the system to recharge on command even when the alternator 105 is not running. While the duration-to-charge tune may be longer, the net result may be the same. In addition, more and/or larger banks of UCs can be added to increase the system's total energy storage capabilities, for example, for an Auxiliary Power Unit (APU).

In some embodiments, the Module 100 can, physically and/or energetically, be sealed to meet most or all applications. For example, the Module 100 can be designed to fit into battery group Battery Council International (BCI) size 31 (e.g., corresponding to heavy-duty commercial grade batteries). In some embodiments, the overall shape can be approximately rectangular, and the two wires can correspond to the positive and negative battery terminals. In some embodiments, the Module 100 may be compatible with existing vehicle battery systems and may not require special installation methods, tools, and/or safety requirements, serving as a one size fits all type of architecture. For example, the Module 100 can be designed to fit into housing that is a standard battery size, and can also tie directly on the bus. In some embodiments, the Module 100 can fit into a Group 31 size with a height that is slightly higher than the standard Group 1 battery or "bumped our" to support 18 cells with electronics. A newly tooled case can be used to maximize space as the Module 100 can be lighter than a heavy lead battery. FIGS. 1B-C show schematic diagrams illustrating example Use of Engine Start and Battery Support Module 100 installed in a vehicle.

Engine Start and Battery Support Module Architectures

Figure 2A:
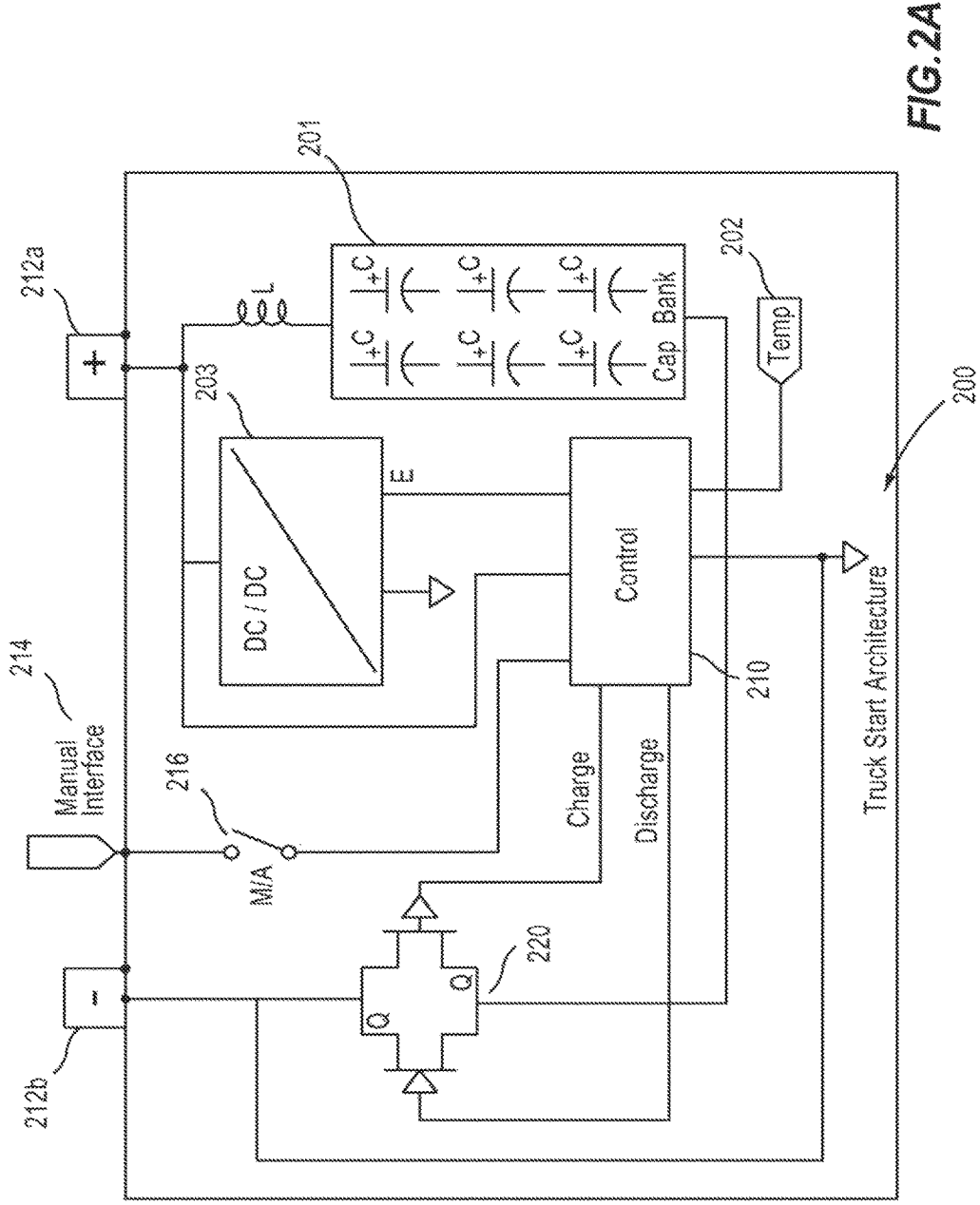
FIGS. 2A-B show circuit diagrams depicting an overall master architecture for an example Engine Start and Battery Support Module.
Figure 2B:
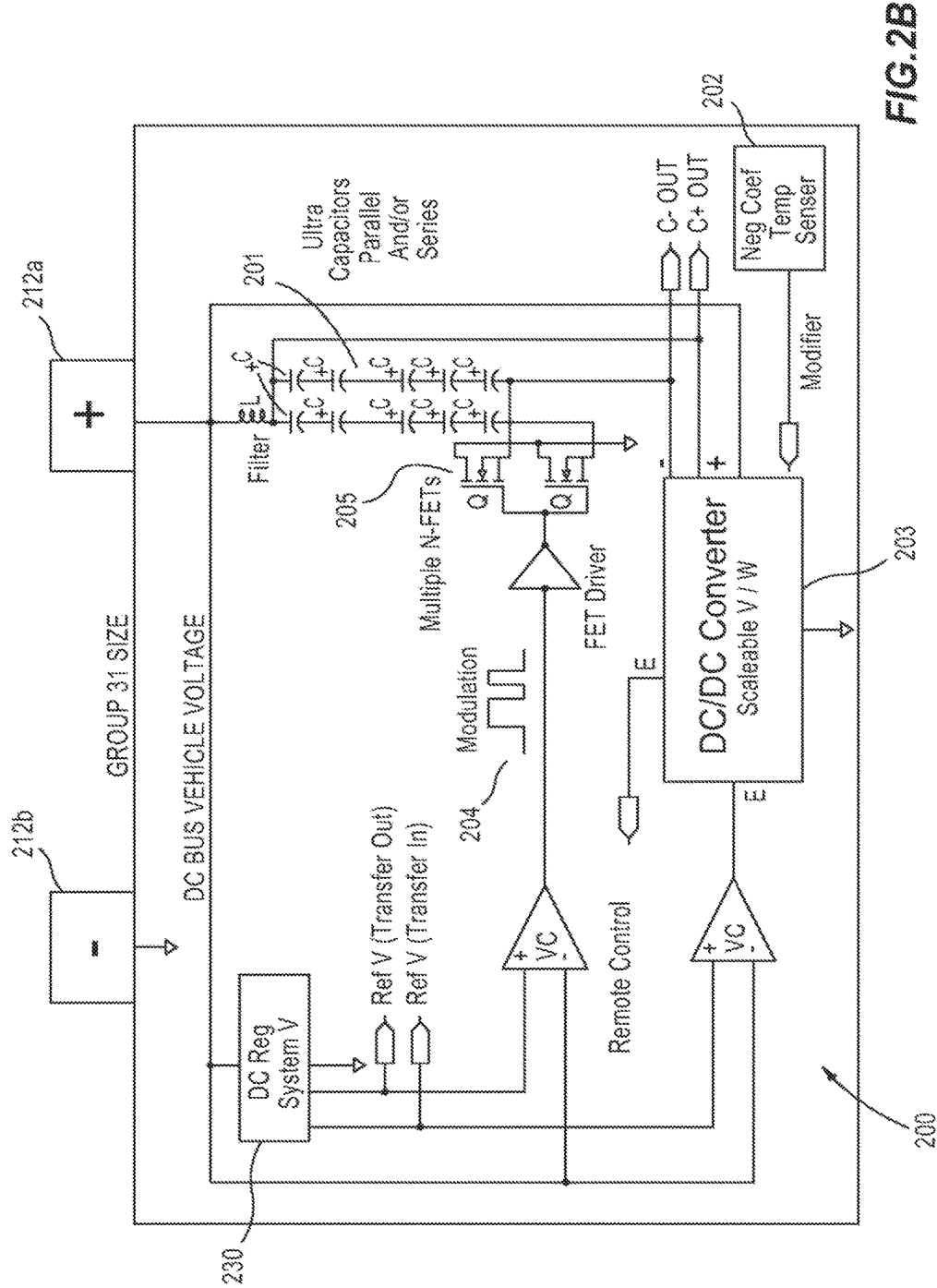

FIGS. 2A-B show circuit diagrams depicting an overall master architecture 200 for an example Engine Start and Battery Support Module 100 with a two wire system corresponding to a positive battery terminal 212a and a negative battery terminal 212b. The architecture 200 allows for independent adjustments of the voltage levels at which hotel loads and engine starts are supported, thus providing for variable energy delivery depending on the specific application and/or exact installation. The Module 100 is capable of modulating the transfer of energy between the UCs 201 and the system batteries 102 in both directions. For example, the Module 100 recognizes when to deliver charge to keep batteries 102 alive for short stops without the engine running. It also recognizes the static loads to reset the electronics in some applications prior to starting. In addition, it may automatically connect any remaining energy in the UC bank 201 directly in parallel to the batteries 103 during an engine start, thereby keeping the system voltage above some determined lower levels that may cause premature battery and starter motor failures. In effect, it changes the ESR of the entire vehicles DC system. Different combinations of series and parallel cell configurations may be used depending on the amount of ESR to be used in comparison to hotel load.

For example, the architecture 200 contains a serial string of UCs 201, each of which can be high specific capacitance electrochemical capacitor that stores energy electrostatically. A typical UC 201 has a capacitance value that is about 10,000 times that of an electrolytic capacitor, an energy density approximately 10% that of a conventional battery, and a power density up to 100 times that of the battery. This allows for a faster charge and discharge cycles for ultra-capacitors 201 compared to conventional batteries. It can also give UCs 201 extremely long cycle lives compared to batteries.

Each UC 201 can be charged to a predetermined level of per cell voltage. As a specific example, the UCs 201 may be charged to support 2.7 V/cell. The per-cell voltage value may be shifted automatically higher (e.g., 3.0 V/cell) when a low temperature is reached (e.g., 0° F.) and even higher per-cell voltage (e.g., 3.3 V/cell) when the temperature falls even lower (e.g., below −20° F.). In some embodiments, the temperature may be measured by a sensor 202. In some embodiments, each pack of UCs 201 may use a DC/DC converter (e.g., a 500 W DC/DC converter) 203 that can be sellable in a factory to a voltage range, e.g., from 16.2 V to 24 V. The converter 203 may have either a boost or single-ended primary inductor converter (SEPIC) topography.

In some embodiment, the energy stored in the UCs 201 may be taken from the DC bus, and in some instances, it may be transferred directly back from the UCs 201 onto the same DC bus, allowing for a controlled charging process of batteries 102 in a vehicle. Effectively, the Module 100 dynamically adjusts the Equivalent Series Resistance (ESR) of the vehicle's electrical system substantially constantly. In some embodiments, the Module 100 comprises UCs 201 that may have significantly lower ESR than a typical battery and offer the ability to store energy quickly and to deliver the stored energy back to the vehicle with minimal interface based on the vehicle's changing needs both instantly and/or on a continuous basis. The lower the ESR of the UCs 201, the more efficient the overall energy transfer can be. The system can be scalable to the desired energy, which may be dictated by the size of the vehicle and its "work flow." The Module 100, by modulating the transfer of energy from the UCs 201 back to the DC battery bus, delivers the desired amount of energy, instead of delivering too much energy (and wasting excess energy) or falling short and not delivering enough energy, as may happen when a module delivers a predetermined amount of power. In some embodiments, the modulation of the transfer of energy and/or the charging and/or discharging of UCs 201 may be controlled by a logic control 210 mat may be in electrical communication with the DC converter 203 and the UCs 201, and can be accomplished via FET 220. The Module 100 determines how to modulate the energy transfer based on variations in voltage and/or current caused by several variables, including but not limited to vehicle DC bus loads, starter motor sizes, battery age, wiring conditions, battery conditions, battery quantity, accessories, starter type, starter age, battery type, temperature, experience of the driver, etc.

For example, the Module 100 may allow for energy to be drawn from otherwise dead batteries over an extended period of time without further collapsing them below a destructive voltage level. For example, a lead-acid battery that is discharged to a point where its voltage in not high enough to start an internal combustion engine may still possess enough energy to completely charge one or more UCs (e.g., if the UC stores less energy than the battery). The Module 100 may charge the UCs 201 from the battery 102 using a DC converter 203 that controls both the current and voltage on both the input side and the output side of the UC 201 and battery 102 couple.

In supporting the DC bus voltage of the vehicle's battery 102, in some embodiments, the transfer of energy to the DC bus may be pulsed, e.g., by a buck converter. For example, the pulse may not be a fixed pulse-width modulation (PWM) 204 but rather may be at the natural frequency of the specific truck that it is installed in. In short, energy transferred from the UCs 201 to the battery 102 is based on the vehicle's demand at that moment. The recharge of the UCs 201 can be either pulsed if the cells are divided to enable a buck converter or recharged using a DC converter 203. In either case, the total voltage on the bank of UCs 201 may be actively adjusted both upwards and downwards depending on some parameter of interest, a particular example being the temperature in the module, as measured by a temperature sensor 202, for example. Such an embodiment may make efficient use of the potential energy that can be stored in each cell as well as extend the life of the cells.

In some embodiments, the Module may recharge the UCs 201 when the alternator 105 isn't running. The DC converter 203 may recharge the bank of UCs 201 by transferring the energy proportional to the vehicle's ability to deliver it. For example, the Module 100 may not take too much energy out or the batteries 102 that the batteries 102 would drain below some lower limit potential (e.g., lower than 9 V). In addition, the power transfer to recharge the UCs 201 can be scalable using parallel combinations of controller chips arranged in a master and (many) slave organization where each controller contributes an additional phase worth of energy up to 12 phases. As such, a 250 W, 500 W, 750 W, etc. charger could be used with little expense. In implementing multiple phases, one phase controls the master timing and the other "slave" phases are shifted by equal intervals from the master. The use of multiple phases allows the power transfer to be spread over time, thus effecting smaller peak currents and smaller more efficient components.

In some embodiments, the UCs 201 can be charged primarily using the vehicle's alternator 105 (shown in FIGS. 1B and 1C). In some embodiments, the UCs 201 can be charged by drawing energy from the batteries 102 of the vehicle. The recharging of the UCs 201 may be either automatic and can occur when the engine 103 is running (i.e., alternator 105 is on) or it may be when commanded to do so during an emergency situation where the vehicle is without enough power to start on its own. For example, the Module 100 can power up and reset itself automatically upon being connected into a live battery system. For example, if the Module 100 is connected in parallel to the battery system 102, when the vehicle is started, the alternator 105 charges the batteries 102 as originally intended while the Module 100 draws energy from the batteries 102. The Module 100 can balance the voltage on the power bus between the UC's 201 and batteries 102 until the UCs 201 have reached capacity.

In some embodiments, each Module 100 may be able to operate in either an automatic and/or manual mode, e.g., via the manual interface 214 shown in FIG. 2A. The automatic mode may be utilized for delivery applications and very short haul uses where the number of engine starts per day are large, where it will be used to keep the battery bus alive for hotel support during a delivery stop. The manual mode may be utilized to start the truck where it will be used to energize the starter 101 with minimal energy used to operate the truck, enough to keep alive the electronics during a start sequence. In some embodiments, whether the Module 100 is in a manual mode or an automatic mode may be controlled by a switch 216 that, when turned on, allows the driver to engage the Module 100 via the manual interface 214.

In the automatic mode of operation, the energy is released initially slowly to maintain a specified battery bus voltage until the UC bank 201 is expended. When the bus voltage equals the UCs voltage, the two systems are effectively in parallel from then on. In the automatic mode, the actual battery bus voltage determines when the system goes from charging to neutral to discharging. When the mode of operation is manual, the energy is released slowly initially to maintain a specified battery bus voltage and then when the UC voltage equals the battery bus voltage the two systems are effectively in parallel. In manual mode, the Module senses an attempt to start the engine as indicated, e.g., by a turn of the ignition key or the voltage on a voltage meter on the instrument panel. Otherwise this system operates just like in the automatic mode except the beginning of the event is triggered intentionally. In the manual mode, the UC system does not lengthen the starting sequence and the driver starts the truck as normal.

Further, in some embodiments, the UCs' per-cell charge can be adjusted and raised during periods of low temperatures (e.g., less than 0° F.) and even higher during ultra-low temperatures (e.g., less than −20° F.). The raising of the cell voltage, which can be dynamic and/or automatic, may lead to an increase in the UC energy storage capability. In addition, some embodiments allow for the slow release of this energy based on the DC bus voltage using a pulse-width modulation (PWM) controller. The charging can be either from an onboard DC/DC converter 203, an alternating current (AC) hook up, and/or from smartly switching the banks of UCs 201 between parallel and serial connections.

The cell charging system has three characteristics, the first being where possible the alternator 105 may be used to recharge the UCs 201 up to a predetermined voltage, e.g., 14.5 V. This may be accomplished using a FET 220 when the bus voltage is higher than the voltage across the UC bank 201. Second, above 14.5 V, each product can use a 500 W DC/DC converter 203 that is sellable in the factory to a desired voltage range, e.g., from 16.2 V to 24 V. The converter 203 may be designed on a boost or SEPIC topography, and is capable of working down to 9 V in the event a future re-start option is included. Third, when the voltage on the pack reaches its predetermined set point, even when the truck is off for extended periods, the converter 203 may be designed to minimize its quiescent current to keep the overall system's drain low, yet with the dependability of being available for a start at any time. The current drain may be approximately 1 W per 100 kJ of stored energy, once charged, for example.

Cell balancing can be a clamping type in order to reduce or minimize self-drain. It can have temperature compensated set points with one or more distinct levels, e.g., three levels at 2.7 V, 3 V, and 3.3 V. In some embodiments, the voltage set points may be maintained at the DC system voltage regulator 230. e.g., the DC system voltage regulator 230 may be set to match various ultracapacitor cell voltages for balancing. In some cases, the balancing may be supplied by the ultracapacitors 201 and/or the DC system voltage regulator 230 to reduce or minimize self-drain. In some embodiments, this compensation may happen automatically. In some embodiments, the cell balancing can be on the same Printed Circuit Board Assembly (PCBA) as the control logic 210 in FIG. 2A.

In the exemplary implementations discussed herein and/or any other implementations of the embodiments of the present technology, additional features may be available. For example, a smart user interface 107 could be included (e.g., connected to the Module 100 via a cable as shown in FIG. 1B) to indicate to the driver the status of the UC pack 201 (e.g., UC power level). The smart user interface 107 may include LED status indicators or a "smart" UC fuel gauge display that indicate the status of the UC pack 201. It may also include "Redo" button that gives the driver the option to redo a charge sequence. Further, connections to the controller area network bus (CANbus) of the vehicle could be offered for belter integration into the vehicle's system, in some cases by the vehicle manufacturer as an integral part of the built-in display.

In some embodiments, the energy in the Module 100 may be stored at a level that is higher than the nominal voltage on the bus and may then be released as desired to support the healthy DC bus voltage of a vehicle regardless of the static load 104 or even during the vehicle's starting sequence. In some embodiments, the vehicle starting event may be regarded as a big static load, and the Module's support of the DC bus may cover both the vehicle starting sequence and the static load. In these embodiments, rewiring the vehicle or delivering energy to the starter motor 101 may become unnecessary. The module architecture 200 keeps the voltage stored in the UC bank 201 at a higher level than the battery bus and releases it slowly depending on the dip of that bus voltage due to load changes. Pure DC is pushed to the bus using a PWM buck converter with N-channel FETs 205 delivering the power with an inductor sized for the hotel or truck electronics load only after which it saturates when the FETs 205 are on fully. The PWM 204 puts the UC bank 201 in parallel to the battery 102 when the PWM 204 reaches 100% on. The loop maintains a predetermined battery bus voltage level with a time response rated at >10 kHz.

In some embodiments, the Module 100 delivers energy directly to the DC bus and does so in an asynchronous way without (intentional) hysteresis. As such, even during an engine cranking, the system may maintain a voltage as close to a set point (e.g., 12.5 V) as possible even as the load of the system changes by a large factor (e.g., 1000 or more) during a starting cycle. In some embodiments, the recharge may be multi-phase and dynamic with four quadrants being controlled allowing the system to adjust to the environment, the state of charge of the UCs, and the system batteries. (Here, the term "quadrants" refers to the current and voltage control of the input and output of the converter.) Further, the transfer of energy is pulsed in variable amounts, thereby reducing pseudo Electro-Magnetic Interference (EMI) emitted from the module. The Module 100 acts very much like a frequency-hopping radio in this regard. The pulses may occur at a fixed repetition frequency or have fixed pulse widths.

DC Converters for Recharging Ultracapacitors

Figure 3A:
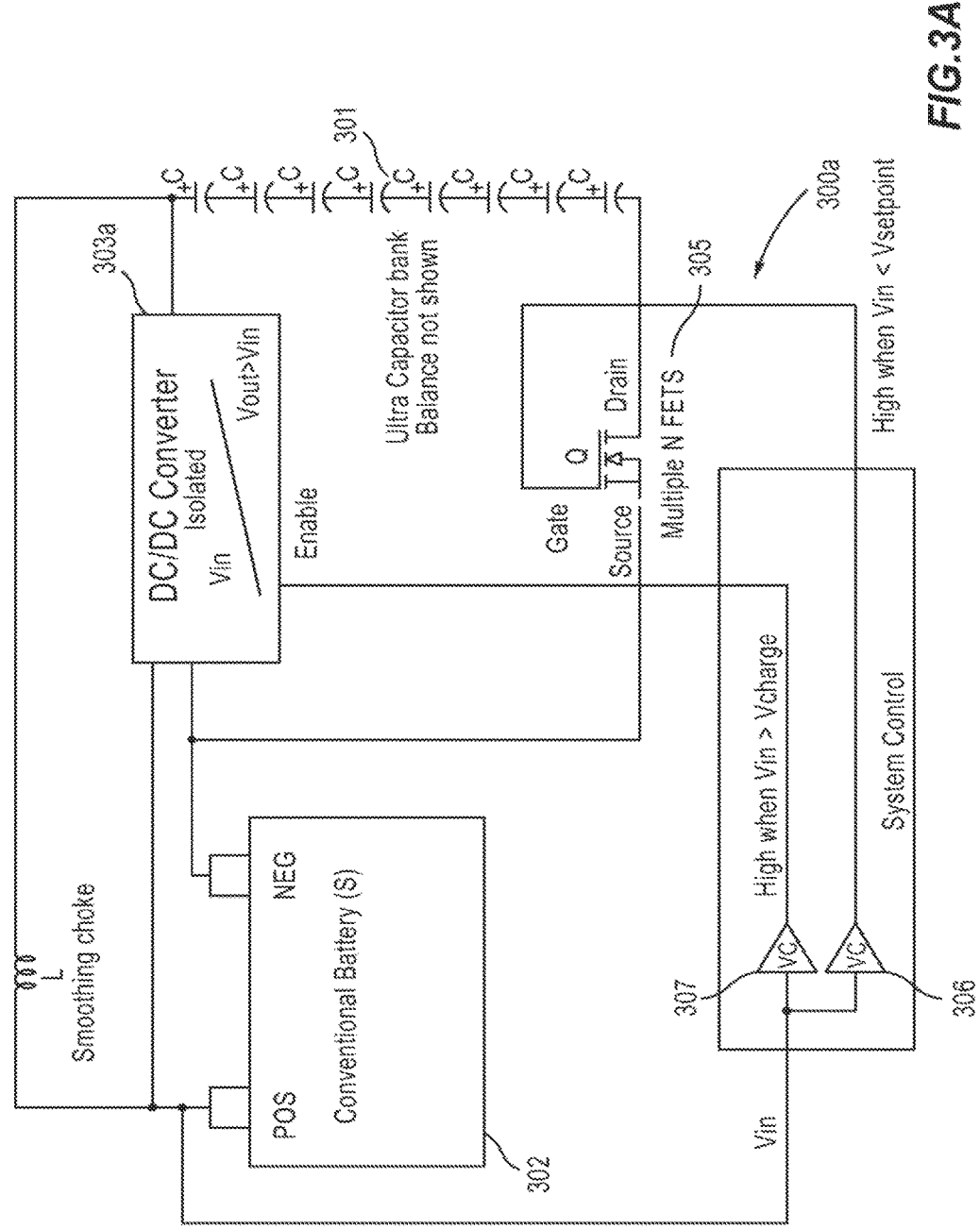
FIGS. 3A-C show several embodiments of a DC converter that may be used in the Engine Start and Battery Support Module to recharge a bank of expended ultracapacitors.
Figure 3B:
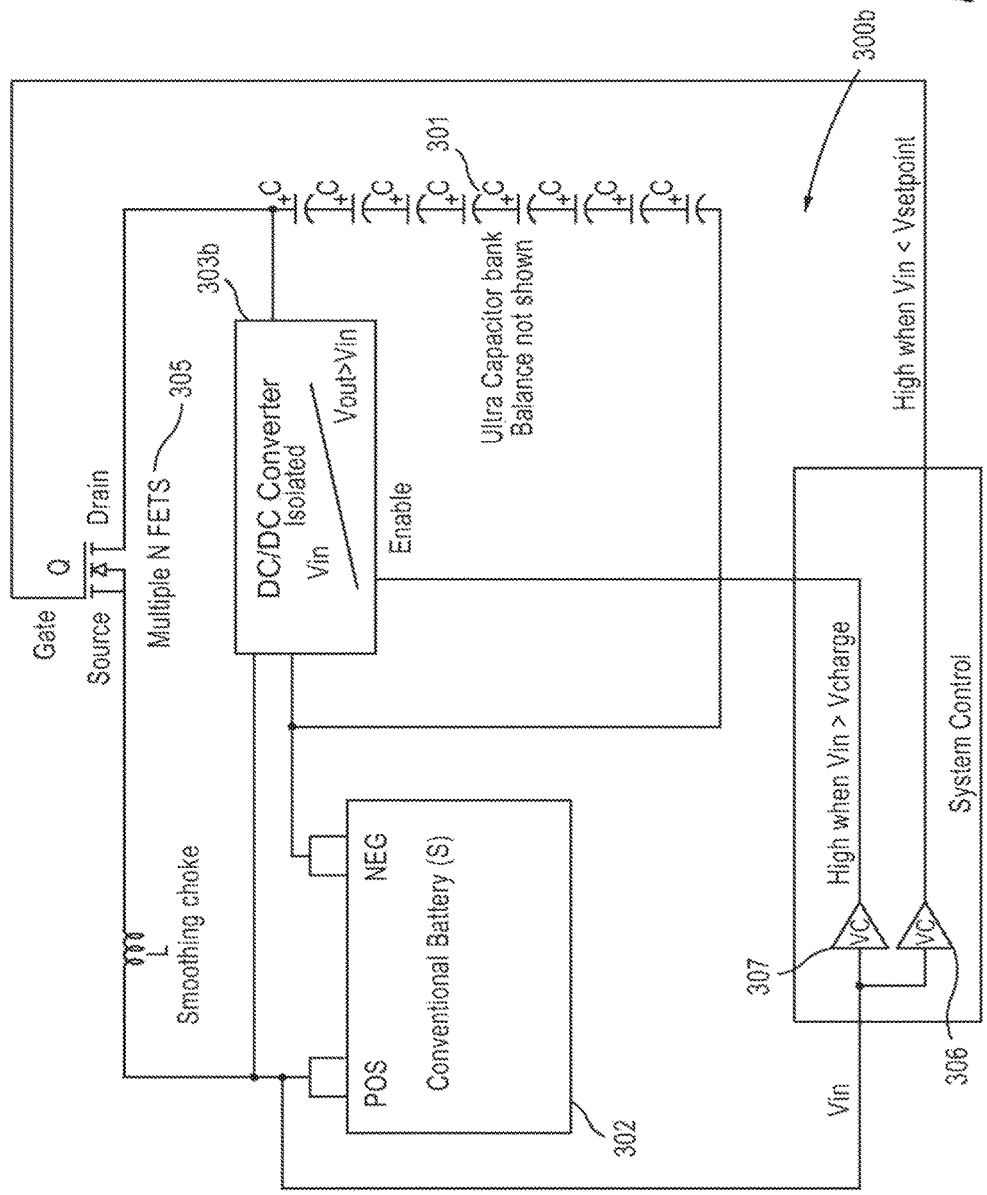
Figure 3C:
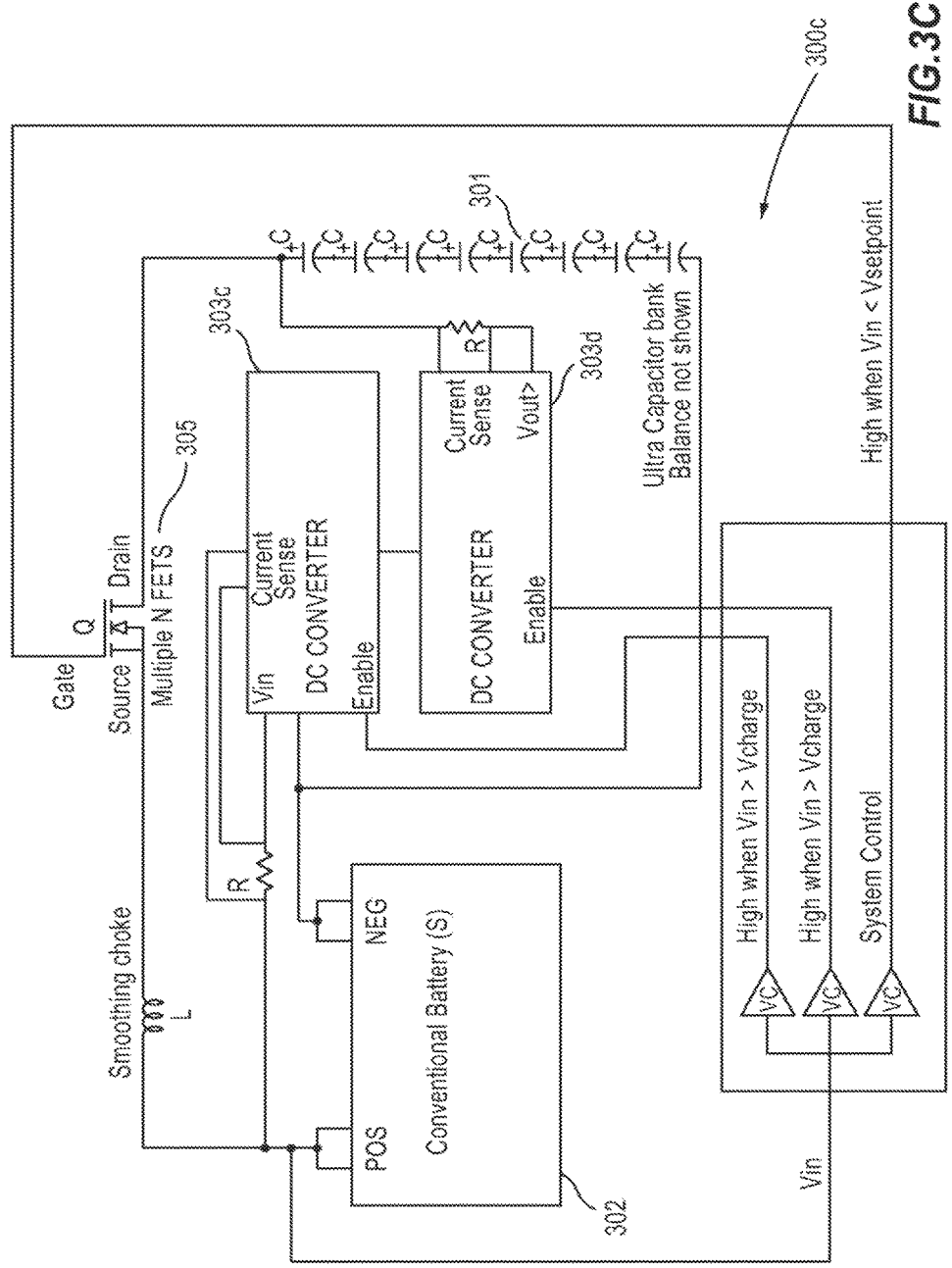

FIGS. 3A-C show several embodiments of a DC converter 303 that may be used in the Module 100 to recharge the bank of UCs 301 when they are expended. The recharge may occur in between start cycles and while the engine is running. Further, in some embodiments, the converters 303 may be used to charge the UC bank 301 initially when the Module 100 has been installed and to recharge the UC bank 301 when the batteries 302 and the bank of UCs 301 are depleted either by extended vehicle off-time or when the vehicle will not start after the initial attempt(s). In such embodiments, the DC converter 303 may be able to control the input voltage cutoff so as not to ruin an otherwise depleted battery (e.g., when it is drawing energy from the battery 302 to charge up the UCs 301), control both the input and output current in order to be able to charge nearly empty UCs 301, and/or control a variable output voltage set point in order to control the energy stored on the bank of UCs 301 as the temperature varies.

Exemplary embodiments of DC converters 303 that can be used in the Module 100 comprise enhancement mode (normally open) N-FETs that allow for the modulation of the transfer of power to a vehicle's DC bus. In some embodiments, the DC converter 303 may be bi-directional, while in others it may not be bi-directional, but rather may comprise separate converters that regulate the transfer of power by monitoring the currents on either side. Further, in some embodiments, the DC converters 303 in the Module 100 may have no limitations as to how much energy can be transmitted on the delivery side. In addition, they may be scalable. For example, during an engine start the energy may be transferred without much delay and with as much energy as the UCs 301 have stored in order to keep that DC bus at some desired voltage (e.g., 12.5 V), which may effectively result in the UCs 301 being in parallel to the battery 302 in a starting sequence.

FIG. 3A shows an example module architecture 300a coupled to a conventional battery 302 in vehicle. The module includes a bank of UCs 301 connected in series with a DC voltage bus that is electrically connected to the battery's 302 positive terminal and an isolated DC converter 303a. The DC converter 303a may be electrically isolated as the positive is connected to the positive battery terminal (BAT+) through the inductor, effectively changing its ground potential. In these embodiments, the control of voltage and current on its input and output may have to be transferred over the isolated barrier.

The ground side of the UC bank 301 is coupled to the drain side of a set of N-FETs 305, which have sources coupled to the battery's 302 negative terminal and the DC converter 303a. In some embodiments, the gates of the N-FETs 305 are coupled to the output of a first voltage comparator 306, which has an input coupled to the DC voltage bus. A second voltage comparator 307 has an input coupled to the DC voltage bus and an output that enables or disables the isolated DC converter 303a. In operation, the first voltage comparator 306 compares the bus voltage to a set point voltage (e.g., 12 V) and triggers a pulse from the UC bank 301 whenever the bus voltage rails below the set point voltage, thereby maintaining the bus voltage at or above the set point voltage. The second voltage comparator 307 compares the bus voltage to charge voltage (e.g., 13.5 V) and enables the DC converter 303a whenever the bus voltage falls below the charge voltage. In response to the enable signal, the DC converter 303a charges the UC bank 301.

FIG. 3B shows a non-isolated DC converter 303b where the N-FETs 305 are in the high side and the DC converter 303b charges the "tops" of the UCs 301 maintaining a ground connection all the time. This allows the DC converter 303b not to be isolated, reducing the cost of it significantly in both prototyping and production terms. In some embodiments, the drive circuit for the N-FETs 305 may have the gate-source voltage $V_{gate\text{-}source}$ to be at least several volts (e.g., 10 V) higher than the source voltage $V_{source}$ (and in some instances, the $V_{source}$ may be BAT+). Since, in such embodiments. BAT+ may be sitting between 9 volts and 14.5 volts above ground, this may cause $V_{gate\text{-}source}$ to be approximately 24 volts, which could result in the use of a small separate boost circuit. In some embodiments, one may also use isolated high side FET drivers that can switch this voltage level into the high gate capacitance for the parallel bank of N-FETS that may be used to deliver the current during an engine start. The exemplary embodiment shown in FIG. 3B has the advantages of having fewer connections and components.

FIG. 3C shows a system comprising two DC converters 303c and 303d, where one converter 303d is used to charge or recharge the bank of UCs and the other converter 303c is used to deliver the energy back to the DC bus. Each of these converters in their "normal" mode may have a set point that triggers the converter to turn on. For example, to promote a healthy battery, an exemplary 12.5 V set-point may be chosen to deliver energy back to the DC bus and a 13.75 V set-point to initiate a recharge cycle. Other set points can be determined differently as these are adjustable. However, the Module architecture 300c also monitors the input and output currents. This feature allows the recharging of the UCs 301 to begin at times other than just when the alternator 105 is running, such as but not limited to when the batteries 302 are too weakened to perform a start and the bank of UCs 301 are exhausted such as during an extended stop.

FIG. 3E and FIG. 3D show details of some example features of the isolated DC converters 303c and 303d, respectively. In some embodiments, these converters may be bi-directional, and in others, they may not be bi-directional. In the examples shown in FIGS. 3D-E, the separate isolated converters regulate the transfer of power by monitoring currents on the charge input side (FIG. 3E) and the discharge output side (FIG. 3D).

As discussed above, in some embodiments, a Module's energy may be stored in UCs 201 that may be configured in series and/or parallel configurations. The amount of capacitance and/or the type of battery a Module 100 is compatible with may not be restricted, and in most embodiments, the voltage on the capacitors 201 may be higher than the voltage in the vehicle. The method of boosting the voltage can employ a conventional boost style converter that can be configured as a flyback, straight boost, or SEPIC, and may be either isolated or non-isolated. The converter can use a multi-phase approach to minimize the peak switching currents, which can in turn allow smaller, more efficient components, better EMI performance, and lower cost. In increments of a set amount of power (e.g., 250 W), more phases can be added that may increase the recharge power level and reduce the recharge time. When each phase is added its switching frequency may intentionally be out of phase with the first switch.

Internal Ultracapacitor Connections for Charging and Discharging

Figure 4:
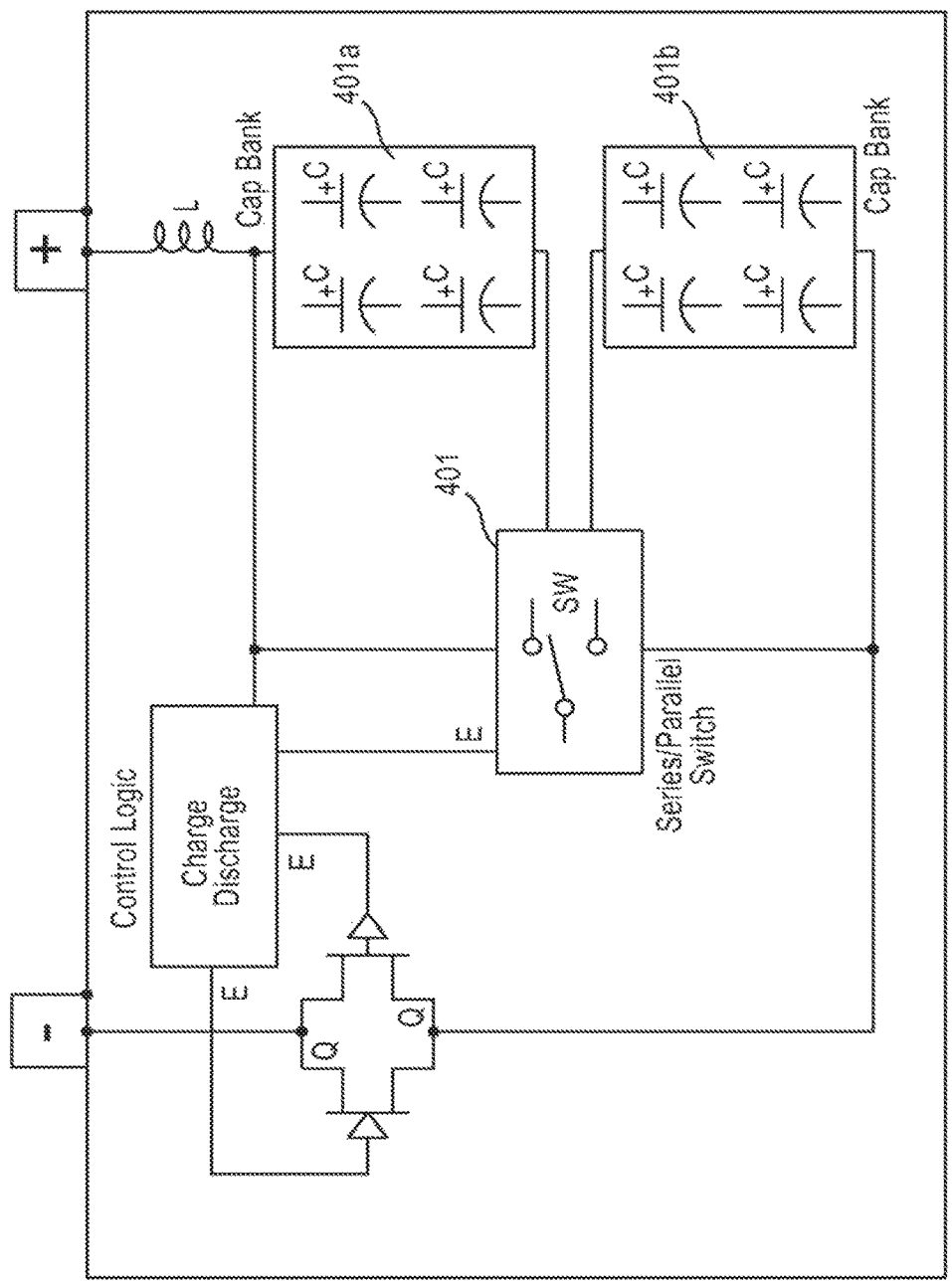
FIG. 4 shows switches in an Engine Start and Battery Support Module for switching inter-cell connections between ultracapacitors from series connections to parallel connections and vice versa.

FIG. 4 shows an embodiment depicting the changing of inter-cell connections within UCs 401 between series and parallel connections to accommodate a buck-only charge and discharge scheme is shown. In some embodiments, the UCs 401 may be recharged by splitting them up into equal banks of cells 401a and 401b where their fully charged total voltage is less than the vehicle's system. In some embodiments, the UCs 401 may be charged by splitting the UCs 401 into several banks, each bank containing same and/or different number of UCs 401. In such embodiments, the UCs 401 can be recharged in a buck mode where energy is pulsed down to the caps. Such embodiments require more solid state switches and additional current control. When charged, the packs may be put back in series and readied for delivering power. In some embodiments, a series/parallel switch 402 can split the UCs 401 into two parallel banks 401a and 401b with equal numbers UCs 401 with total voltages below the vehicle's system voltage, or connect them to form a single UC bank with a total voltage above the vehicle's system voltage. In some embodiments, this may allow a single buck converter to be used for charging and discharging the UCs 401.

FIGS. 5A and 5B show converters 503 that can be used in some exemplary methods of charging the UCs 501 in the Module 100. FIG. 5A shows a separate and dedicated non-isolated DC converter 503a that boosts the voltage up to the UCs 501a during a recharge cycle. FIG. 5B shows splitting the cell stack in two 501b and 501c (e.g., equal halves each containing half of total number of cells) and then buck charging each half in parallel using the vehicle's nominal DC bus as the point where the energy is taken from. In some embodiments, the vehicle's voltage may be higher than each of the split cells. The energy may be pulsed in a controlled manner to each stack in a buck mode concept. The switches 302 represent points where the stacks are "put together" and then "separated" to accomplish this. Once charged to a given voltage, the two stacks are then put back in series for use in the "delivery" mode, i.e., energy out mode. The mechanical switches 502 shown represent the "solid state" switching that may occur in real time.

In some embodiments, the switches 502 may be comprised of enhancement mode N-FETs and may carry the appropriate maximum current when connected in the delivery (energy out) mode (e.g., up to 2500 A). In some embodiments, the FETs can be sized to handle the charging current which may be in the range of 10-25 A. The switching of FIG. 5B may be less expensive and may provide for smaller electronics and allow for the re-usage of the on-board inductor in both directions. In some embodiments, the current mode controller may monitor and limit the root mean square (RMS) current that flows from the vehicle's battery to the two stacks of UCs 501b and 501c smartly and under most or all circumstances of the state of the charge on the capacitors. In some embodiments, more capacitors 501, and more stacks of UCs (e.g., 3, 4, 5, etc.) may be used, where each stack may contain same and/or different number of UCs.

In some embodiments, the DC converters shown in FIG. 5B can be utilized to buck switch the charging of the bank of UCs 501 by splitting the UCs 501 into two equal stacks 501b and 501c then recombining them in series when they are charged and readied for use. The splitting of the UCs 501 in two equal stacks may allow the UCs' fully charged voltage to be double when recombined (e.g., each is charged to 12.0 V, or 24.0 V when recombined). The example as shown in FIG. 5B includes four switch circuits 502a, 502b, 502c and 502d where two of those switches 502c and 502d may be capable of handling the high currents during an engine start and the other two 502a and 502b can be sized smaller as they are used to let charging currents pass through them. An example of a switch that can be used is N-FET.

In some embodiments of FIG. 5B, several N-FETs may be used to modulate power back to the DC bus. For example, if a Module 100 in a non-split configuration (e.g., FIG. 5A) includes ten N-FETs, the total number of N-FETs for split cell configuration (e.g., FIG. 5B) could increase to 22 N-FETs. In such embodiments, depending on the current level, inductive current sensing instead of standard current sense resistors may be used for sensing high current. Some embodiments may include one or more voltage sensors to measure small voltage drop across the inductor and then create the closed loop controls around their values.

FIGS. 6A-B shows detailed circuit diagram schematics of exemplary DC converters that may be used in the Module.

The DC converters can be multi-phase boost converters capable of delivering 250 W/phase with four-quadrant current and voltage control on both the input and output. This system can have an efficiency of approximately 95% and can be single phase. As each phase gets added, the power can increase proportionally. Each successive phase is intentionally "out of phase" with the preceding one by 360°/n where n is the total number of phases. This reduces the peak currents and keeps the component sizes small. The system may allow for faster recharge rates where these phases could be added at the request of the customer, or they may be proportional to the size of the vehicle where the module is to be installed.

Operation of an Engine Start and Battery Support Module

FIG. 7 shows a flow diagram illustrating an example operating process for an Engine Start and Battery Support Module 100. In some embodiments, the DC converter may be able to control or set the thresholds and maximum values for both the input and output voltages and current. Charging UCs 701 when they are empty may present a problem in that they may act like dead shorts, and unless the output current is sensed and controlled the DC converter may hiccup, collapse, or burn up. Setting an output current limit should help avoiding or limiting such complications.

In some embodiments, the output voltage setting may set the desired voltage on the UCs 701 and may be variable based on temperature in order to increase or maximize the capacitor's life and deliver the appropriate energy when desired, especially in ultra-cold environments. And the input current limit and minimum voltage can be useful in avoiding the collapse of the batteries 702 below their sale operating region (e.g., 9 volts in a 12-volt system) when the DC bus is being drained during a recharge recycle while the alternator is off. In some embodiments, this function may be dynamic and the control may be proportional—the more power is available for the recharge, the more power the system (e.g., converter 703) may take. For example, at 9 volts, the power consumed by the converter may be zero, and at 13.75 volts the power may be 250 Watts for a single phase system and for any voltage in between, the power consumed may be proportionally in between 0 Watts and 250 Watts. In some embodiments, the converter may also have a quiescent current of less than 25 mA when it is disabled which may be useful in maintaining overall system performance.

Example Engine Start and Battery Support Modules

The following non-limiting examples are intended to highlight aspects of Engine Start and Battery Support Modules according to principles of the present disclosure.

Example device 1: Number of cells: eight in series; UC cell capacitance: 3000 F; Total Capacitance: 375 F; Voltage: 21.6 V when the temperature is greater than about 0° F. and 24 V when the temperature is less than about 0° F.

Example device 1 can provide "hotel load" support as a primary function with the secondary function being reserving energy for the actual starting sequence. The ratio is approximately 10:1 with the hotel load support getting more energy. The system automatically supports a battery bus voltage from a string of UCs stacked in series and charged up to 2.7 V/cell or 3.0 V/cell depending on temperature. When the voltage on the cells equals the battery voltage they are then put in parallel by the design of the architecture. Exemplary application of this device is when vehicles are used for delivery.

Example device 2: Number of cells: two parallel strings of six cells each in series; UC cell capacitance: 3000 F; Total Capacitance: 1000 F; Voltage: 16.2 V when the temperature is greater than about 0° F. and 18.0 V when the temperature is less than about 0° F.

Example device 2 can deliver energy to crank the vehicle while providing a reduced or minimal amount of energy to keep alive the vehicle electronics during that process. Exemplary application of this device is when vehicles are used for capacitance without auxiliary power units.

Example device 3: Number of cells: three parallel strings of six cells each in series; UC cell capacitance: 3000 F; Total Capacitance: 1500 F; Voltage; 16.2 V when the temperature is greater than about 0° F. and 18.0 V when the temperature is less than about 0° F.

Example device 3 can deliver energy to crank the vehicle while providing a reduced minimal amount of energy to keep alive the vehicle electronics during that process. This application supports delivering more energy for vehicle electronics during vehicle starting event, especially on vehicles where there are more than four batteries in parallel. Exemplary application of this device is when vehicles are used for capacitance with auxiliary power units.

Example device 4: Number of cells: three parallel strings of six cells each in series UC cell capacitance; 3000 F; Total Capacitance: 1500 F; Voltage: 16.2 V when the temperature is greater than about 0° F., 18.0 V when the temperature is less than about 0° F., and 19.8 V when the temperature is less than about −20° F.

Example device 4 delivers increased or maximum energy to crank the vehicle in ultra-low temperature applications.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent. Is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium dial convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and is the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used is the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention is claimed is:
1. A method for regulating a voltage level of a vehicle battery in a vehicle, the method comprising:
  determining if the voltage level is below a predetermined voltage threshold;

if the voltage level is below the predetermined voltage threshold, initiating a discharge of at least one ultracapacitor in electrical communication with the vehicle battery;

modulating the discharge of the at least one ultracapacitor so as to raise the voltage level at least to the predetermined voltage threshold; and while a vehicle alternator is off, transferring energy from the vehicle battery to the at least one ultracapacitor, wherein the transfer of energy is initiated only when the voltage level of the vehicle battery exceeds the recharge voltage threshold.

2. The method of claim 1, wherein the predetermined voltage threshold is determined based on at least one of vehicle battery age, vehicle age, vehicle battery condition, vehicle battery quantity, vehicle battery type, vehicle starter type, starter age, temperature, and experience of a driver of the vehicle.

3. The method of claim 1, wherein modulating the discharge of the at least one ultracapacitor comprises controlling current flow through at least one transistor in electrical communication with the at least one ultracapacitor.

4. The method of claim 1, further comprising:
transferring energy from the vehicle battery to the at least one ultracapacitor when the voltage level is less than a voltage level required to start the vehicle.

5. The method of claim 1, wherein the at least one ultracapacitor comprises a plurality of ultracapacitors, and further comprising:
switching the plurality of ultracapacitors between a parallel configuration for charging and a serial configuration for discharging.

6. An apparatus for regulating a voltage level of a vehicle battery, the apparatus comprising:
a plurality of ultracapacitors connected in series to store charge;
at least one voltage comparator, in electrical communication with the vehicle battery and the plurality of ultracapacitors, to perform a comparison of the voltage level to a predetermined voltage threshold;
control logic, in electrical communication with the at least one voltage comparator and the plurality of ultracapacitors, to modulate discharge of the plurality of ultracapacitors based on the comparison of the voltage level to the predetermined voltage threshold so as to raise the voltage level to at least the predetermined voltage threshold; and
a direct current (DC) converter, in electrical communication with the plurality of ultracapacitors and the at least one voltage comparator, to charge the plurality of ultracapacitors in response to a comparison of the voltage level and a recharge voltage threshold,
wherein the at least one voltage comparator comprises:
a first voltage comparator, in electrical communication with the DC converter, to enable the DC converter if the voltage level exceeds the recharge voltage threshold; and a second voltage comparator, in electrical communication with the controller logic, to perform the comparison of the voltage level to the predetermined voltage threshold.

7. The apparatus of claim 6, wherein the control logic comprises at least one transistor, in electrical communication with the plurality of ultracapacitors, to control current flow into and/or out of the plurality of ultracapacitors.

8. The apparatus of claim 7, wherein the at least one comparator is in electrical communication with a gate of the at least one transistor to control the current flow into and/or out of the plurality of ultracapacitors.

9. The apparatus of claim 6, wherein the DC converter is configured to transfer charge from the vehicle battery to the plurality of ultracapacitors in response to an output from the at least one voltage comparator indicating that voltage level is above the recharge voltage threshold.

10. The apparatus of claim 6, further comprising:
a temperature sensor, operably coupled to the DC converter, to monitor a temperature of the vehicle battery.

11. The apparatus of claim 10, wherein the DC converter is configured to vary the predetermined voltage threshold and/or the recharge voltage threshold based on the temperature of the vehicle battery.

12. The apparatus of claim 9, wherein the DC converter is further configured to deliver energy to a vehicle bus of the vehicle in response to an output from the at least one comparator.

13. The apparatus of claim 6, further comprising:
a switch, in electrical communication with the plurality of ultracapacitors, to switch the plurality of ultracapacitors between a serial configuration and a parallel configuration.

14. The apparatus of claim 6, further comprising:
a manual interface, operably coupled to the control logic, to enable a driver of the vehicle to engage the apparatus.

15. An apparatus for regulating a voltage level of a vehicle battery, the apparatus comprising:
a plurality of ultracapacitors;
a first voltage comparator, in electrical communication with the vehicle battery, to compare the voltage level to a first voltage threshold;
control logic, in electrical communication with the first voltage comparator and the plurality of ultracapacitors, to discharge of the plurality of ultracapacitors if the voltage level is below the first voltage threshold;
a second voltage comparator, in electrical communication with the vehicle battery, to compare the voltage level to a second voltage threshold;
control logic, in electrical communication with the first voltage comparator and the plurality of ultracapacitors, to discharge of the plurality of ultracapacitors if the voltage level is above the second voltage threshold;
a direct current (DC) converter, in electrical communication with the plurality of ultracapacitors and the second voltage comparator, to charge the plurality of ultracapacitors if the voltage level is above the second voltage threshold; and
a temperature sensor, operably coupled to the DC converter, to monitor a temperature of the vehicle battery,
wherein the DC converter is configured to vary the first voltage threshold and/or the second voltage threshold based on the temperature of the vehicle battery.

* * * * *